(12) United States Patent
Escarcega et al.

(10) Patent No.: US 10,203,667 B2
(45) Date of Patent: Feb. 12, 2019

(54) APPARATUS AND METHOD FOR PREDICTING WINDUP AND IMPROVING PROCESS CONTROL IN AN INDUSTRIAL PROCESS CONTROL SYSTEM

(75) Inventors: John A. Escarcega, Scottsdale, AZ (US); Charles Q. Zhan, Chandler, AZ (US); Joseph Z. Lu, Glendale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 276 days.

(21) Appl. No.: 13/223,546

(22) Filed: Sep. 1, 2011

(65) Prior Publication Data

US 2013/0060353 A1 Mar. 7, 2013

(51) Int. Cl.
*G05B 13/02* (2006.01)
*G05B 13/04* (2006.01)
*G05B 5/01* (2006.01)

(52) U.S. Cl.
CPC ............ *G05B 13/048* (2013.01); *G05B 5/01* (2013.01)

(58) Field of Classification Search
CPC ........... G05B 1/00; G05B 13/048; G05B 5/01
USPC ................................................ 700/1, 28, 29
See application file for complete search history.

(56) References Cited

U.S. PATENT DOCUMENTS

| | | | |
|---|---|---|---|
| 6,980,938 B2 | 12/2005 | Cutler | |
| 7,231,291 B2 * | 6/2007 | Dollmeyer et al. | ........... 701/114 |
| 7,263,473 B2 | 8/2007 | Cutler | |
| 7,444,193 B2 | 10/2008 | Cutler | |
| 7,447,554 B2 | 11/2008 | Cutler | |
| 7,599,751 B2 | 10/2009 | Cutler | |
| 7,860,586 B2 * | 12/2010 | Boyden | ............... G05B 13/048 |
| | | | 422/168 |
| 2002/0022892 A1 | 2/2002 | Bergold et al. | |
| 2003/0216823 A1 | 11/2003 | Tanaka | |
| 2005/0015193 A1 * | 1/2005 | Yasui | .................... F02D 31/002 |
| | | | 701/99 |
| 2005/0107895 A1 * | 5/2005 | Pistikopoulos et al. | ........ 700/52 |
| 2006/0058899 A1 * | 3/2006 | Boyden et al. | ................. 700/44 |
| 2007/0112442 A1 | 5/2007 | Zhan et al. | |
| 2009/0319092 A1 * | 12/2009 | Piche | ........................... 700/295 |

(Continued)

FOREIGN PATENT DOCUMENTS

EP 0710901 5/1996

OTHER PUBLICATIONS

European Search Report issued for EP 128528374.4 dated Apr. 20, 2016, 6 pgs.

*Primary Examiner* — Ziaul Karim

(57) ABSTRACT

A method includes identifying one of multiple regions in a range where an output (OP) value used to implement a manipulated variable is located. The manipulated variable is associated with an industrial process, and the OP value represents an output of a downstream controller. The method also includes calculating an achievable manipulated variable (MV) limit for the manipulated variable based on the region in which the OP value is located. For example, when the OP value is located in one region, the achievable MV limit could match a user-specified limit or be based on a gain between the OP value and a value of a process variable. When the OP value is located in another region, the achievable MV limit could track the value of the process variable with a gap.

20 Claims, 9 Drawing Sheets

(56) References Cited

U.S. PATENT DOCUMENTS

2011/0106402 A1   5/2011  Yasui et al.
2012/0010758 A1*  1/2012  Francino et al. ............. 700/291

* cited by examiner

APPARATUS AND METHOD FOR PREDICTING WINDUP AND IMPROVING PROCESS CONTROL IN AN INDUSTRIAL PROCESS CONTROL SYSTEM

TECHNICAL FIELD

This disclosure relates generally to industrial process control systems. More specifically, this disclosure relates to an apparatus and method for predicting windup and improving process control in an industrial process control system.

BACKGROUND

Processing facilities are often managed using process control systems. Example processing facilities include manufacturing plants, chemical plants, crude oil refineries, ore processing plants, power plants, and paper or pulp manufacturing and processing plants. Among other operations, process control systems typically manage the use of motors, valves, and other industrial equipment in the processing facilities. In conventional process control systems, controllers are often used to control the operation of industrial equipment in the processing facilities. The controllers could, for example, monitor the operation of the industrial equipment, provide control signals to the industrial equipment, and generate alarms when malfunctions are detected.

In a controller using model predictive control (MPC) technology, at least one manipulated variable (MV) is used to keep at least one controlled variable (CV) at or near a setpoint (MPC.SP) or between high and low limits (MPC.LIMITS). For instance, an MPC controller could receive measurements of a temperature inside a reactor (a controlled variable) and attempt to keep the temperature at or near a setpoint by changing a cooling water flow (a manipulated variable) to a jacket of the reactor. The cooling water flow can be controlled by a downstream proportional-integral-derivative or "PID" controller, which could receive setpoint (SP) commands from the upstream MPC controller and process variable (PV) measurements of cooling water flow rate through a pipe and attempt to keep the flow rate at the commanded setpoint by changing a valve's opening (OP). The MPC controller can also adjust its manipulated variables to achieve an improved or maximum economic benefit. However, a manipulated variable cannot be changed indefinitely. The maximum amount that a manipulated variable can be changed is restricted by the physical limits of a process and its equipment or by operating limits of a downstream controller. In this document, an actual physical limit (APL) is defined as the most restrictive limit among all limits imposed, whether by a process, process equipment, or a downstream controller.

A user is often required to specify high and low operating limits for each manipulated variable. These limits define an admissible range in which the manipulated variable can be changed or "moved" by a controller. However, user-specified limits can gradually become stale or obsolete because the actual physical limits vary over time, such as due to process disturbances or changes or due to downstream controller configuration changes. An MPC controller may always assume that user-specified limits are achievable when determining an optimization solution for that variable, and optimization solutions for other manipulated variables can also be computed with that assumption. The MPC controller may therefore consistently push a downstream controller towards a seemingly-achievable limit until the downstream controller hits the actual physical limit and goes into a windup state. The physical or windup limit can be much closer to the manipulated variable's current value than the user-specified limit.

When this occurs, the MPC controller stops using the user-specified limit and begins using the actual physical limit. This often causes the optimization solution(s) to jump for the wound-up manipulated variable and all related manipulated variables. A downstream controller can also repeatedly go into and come out of windup, which can cause a number of complications. Over a longer period of time, for example, an optimization solution may jump back and forth because the limit that is actually used for optimization switches back and forth, and the user may observe unsettling zigzag movements as one or more downstream controllers (and thus their associated manipulated variables) go into and out of windup repeatedly. Also, as a downstream controller approaches windup or operates close to the windup state, its process variable (often denoted as PV in this document) may drift away from the desired setpoint, causing difficulties in predicting the effects of manipulated or disturbance variables on controlled variables and in determining how to configure the manipulated variables. In addition, since it is often not easy to predict the actual physical limit at which a downstream controller (and thus its associated manipulated variable) enters into windup, various makeshift solutions are often employed, which can produce mixed and inconsistent results.

SUMMARY

This disclosure provides an apparatus and method for predicting windup and improving process control in an industrial process control system.

In a first embodiment, a method includes identifying one of multiple regions in a range where an output (OP) value used to implement a manipulated variable is located. The manipulated variable is associated with an industrial process, and the OP value represents an output of a downstream controller. The method also includes calculating an achievable manipulated variable (MV) limit for the manipulated variable based on the region in which the OP value is located.

In a second embodiment, an apparatus includes at least one processing unit configured to identify one of multiple regions in a range where an output (OP) value used to implement a manipulated variable is located. The manipulated variable is associated with an industrial process, and the OP value represents an output of a downstream controller. The at least one processing unit is also configured to calculate an achievable manipulated variable (MV) limit for the manipulated variable based on the region in which the OP value is located.

In a third embodiment, a system includes a first controller configured to control an industrial process and a downstream second controller configured to generate an output (OP) value used to implement a manipulated variable associated with the industrial process. The first controller is configured to identify one of multiple regions in a range where the OP value is located and calculate an achievable manipulated variable (MV) limit for the manipulated variable based on the region in which the OP value is located.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the'invention. Those skilled in the art will understand that the principles of the invention may be implemented in any type of suitably arranged device or system.

Figure 1:
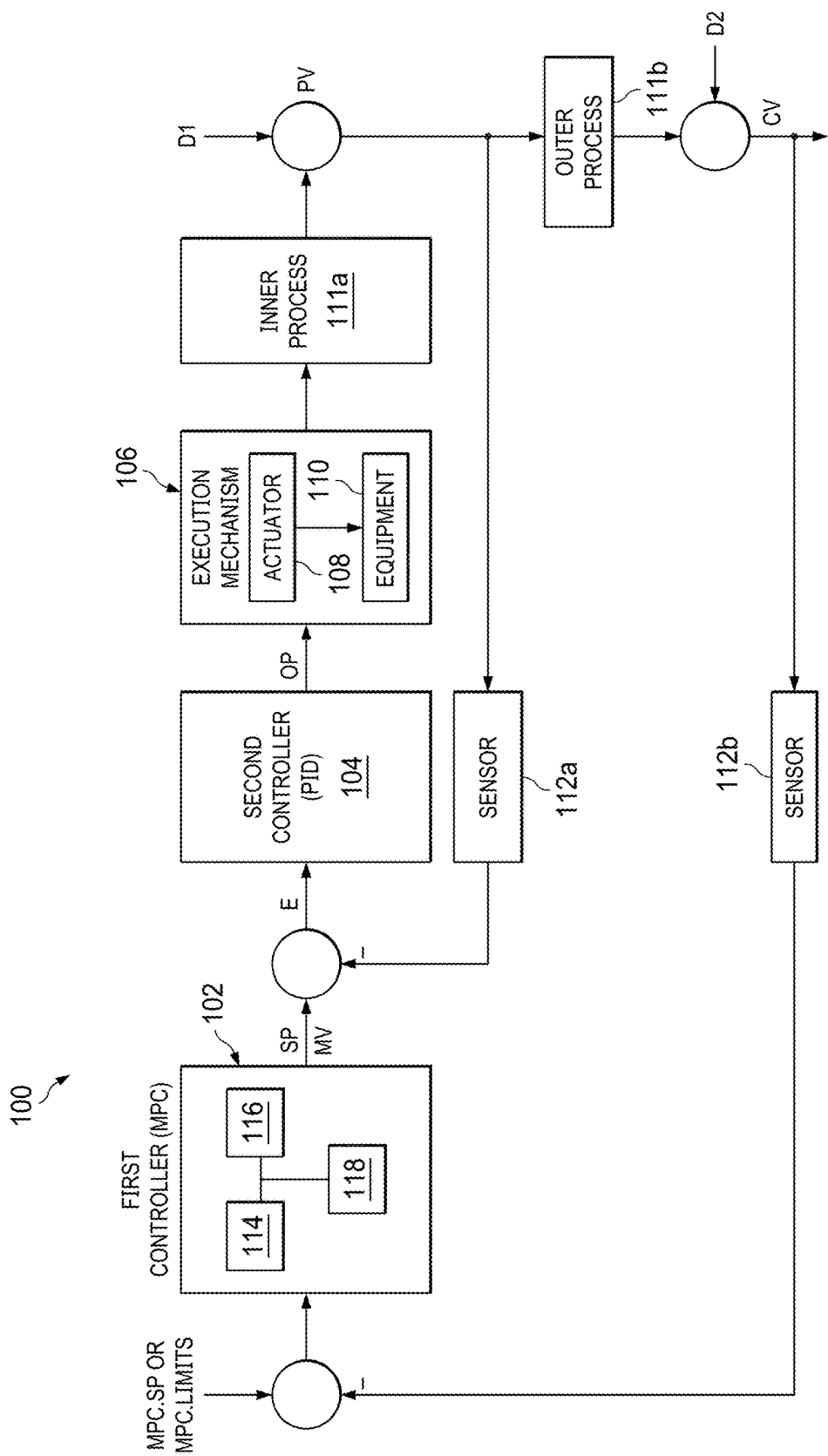
FIG. 1 illustrates a portion of an example process control system according to this disclosure.

FIG. 1 illustrates a portion of an example process control system 100 according to this disclosure. As shown in FIG. 1, the process control system 100 includes a first controller 102 and a second controller 104. The controllers 102-104 control at least part of industrial processes 111a-111b. In this example, the controllers 102-104 control the operation of an execution mechanism 106 that includes one or more actuators 108, which operate to adjust the operation of one or more pieces of industrial equipment 110.

The industrial processes 111a-111b collectively represent any suitable technique that produces or processes one or more materials in some manner. The execution mechanism 106 represents any suitable system or portion thereof for altering the industrial processes 111a-111b. The execution mechanism 106 could include any number of actuators 108 and pieces of industrial equipment 110. Each actuator 108 includes any suitable structure for adjusting one or more pieces of industrial equipment 110. Each piece of industrial equipment 110 can perform any suitable function(s) in the execution mechanism 106. The industrial equipment 110 could, for instance, represent valves, heaters, motors, or other devices.

At least one sensor 112a measures one or more process variables (PV) associated with the process 111a, and at least one sensor 112b measures one or more controlled variables (CV) associated with the process 111b. Each PV or CV represents any suitable characteristic of process, such as a flow rate, temperature, pressure, or other value. Each sensor 112a-112b includes any suitable structure for measuring one or more characteristics of a process.

As noted above, a controller typically adjusts one or more manipulated variables (MV) in order to control one or more controlled variables (CV). A manipulated variable is generally associated with an actuation variable that can be adjusted, such as a setpoint or an output of a downstream controller. A controlled variable generally denotes a measured variable of a process that is controlled (through changes to one or more manipulated variables) so that the controlled variable is maintained at a specified value or within specified limits. An example of this is when an amount of a valve's opening (associated with a manipulated variable) is used to control a temperature inside a reactor (a controlled variable). A disturbance variable generally denotes a variable that can affect a controlled variable and that can be considered but not directly adjusted, such as ambient temperature or atmospheric pressure.

Each of the controllers 102-104 includes any suitable structure for performing control operations to control at least a portion of the processes 111a-111b. Each controller 102-104 could, for example, be implemented using hardware or a combination of hardware and software/firmware instructions. In the example shown in FIG. 1, each controller 102-104 is implemented using at least one processing unit 114, at least one memory unit 116, and at least one interface 118. The at least one processing unit 114 includes any suitable processing structure(s), such as a microprocessor, microcontroller, digital signal processor, application specific integrated circuit, or field programmable gate array. The at least one memory unit 116 includes any suitable volatile and/or non-volatile storage and retrieval device(s), such as a hard disk, an optical storage disc, RAM, or ROM. The at least one interface 118 includes any suitable structure(s) for providing data to one or more external destinations or receiving data from one or more external sources.

In particular embodiments, the controller 102 is implemented as a model predictive control (MPC) controller. An MPC controller uses a model to predict future values of one or more controlled variables (CV) and adjusts one or more manipulated variables (MV) accordingly. As a result, the ability to accurately predict a future value of a CV directly affects the control capabilities of the MPC controller. Also, in particular embodiments, the controller 104 is implemented as a proportional-integral-derivative (PID) controller. However, any other suitable type(s) of controller(s) could be used, such as when the controller 102 represents a fuzzy logic controller, Artificial Intelligence-based controller, heuristic-based controller, or real-time optimizer or the controller 104 represents a PI controller. Also, in particular embodiments, the controller 104 can be implemented as a single PID controller. However, multiple layers of cascaded controllers of any suitable type(s) could also be used, such as when the controller 104 represents a flight of cascaded controllers.

This represents a brief description of a portion of an industrial process and its related control system. Additional details of a process control system are well-known to one skilled in the art and are not required for an understanding of the invention disclosed in this patent document.

In this example, the first controller 102 generates an MV value that becomes a setpoint (SP) for controlling at least one controlled variable (CV) associated with the process 111b. The second controller 104 operates to control a process variable (PV), which allows estimating a difference between the SP and PV values. The PV is controlled by the second controller 104 so that the PV equals or nears the SP. The controller 104 attempts to accomplish this by altering the controller's output signal OP. The sensor 112a measures the actual value of the PV. A difference between the SP and the sensor measurement represents an error signal E, which identifies how far the PV is from its desired SP. The error signal is used by the second controller 104 to generate the OP. The execution mechanism 106 uses the OP to adjust an actuator 108, which manipulates the process equipment 110 that then causes changes to the PV. The PV can also be affected by one or more disturbance variables D1. As the PV changes, it causes the controlled variable(s) CV in the process 111b to change, which then is fed back to the first controller 102 through the sensor 112b. The CV can also be affected by one or more disturbance variables D2. The first controller 102 continues to generate new MV values until the CV in the process 112b satisfies the user-specified limits in the first controller 102. Note that terms such as PV, SP, and OP could be used to denote values associated with a PID controller and terms such as MPC.SP are used to denote values associated with an MPC controller, although other types of controllers could be used as the controllers 102 and/or 104.

In FIG. 1, from the perspective of the controller 102, the SP for the controller 104 is an associated manipulated variable (MV). The SP can be calculated in some embodiments using a model between the MV and CV and using sensor measurements and whatever other data is available or required. The model is typically a very simplified or approximated mathematical representation of a very complex process, and the secondary control loop (controller 104) is often part of the complex process. Ideally, the controller 104 adjusts the OP so that the PV reaches and stays close to the SP. However, when the OP reaches an equipment limitation, the PV can no longer be moved in one of the upward or downward direction. When this occurs and the PV is not capable of achieving the desired SP, the controller 104 goes into a windup state. The controller 102 is forced to honor this state, and the MV associated with the wound-up controller 104 goes into a windup state and is prohibited from moving the SP further away from the current PV. The windup state is removed from the controller 104 once the OP is no longer limited by the equipment. This can be achieved either by the PV drifting toward the SP (such as due to a favorable disturbance of D1) or by moving the SP in a direction that approaches the unachievable PV. Once the windup condition in the controller 104 is rectified, the windup state of the associated MV in the controller 102 is removed, and the controller 102 is free to move the associated MV either up or down.

As noted above, a user can provide user-specified upper and lower limits for an MV, which are used by the controller 102. Under normal circumstances, the controller 102 uses the user-specified limits as the admissible range in which the MV can be adjusted. However, if the user-specified limits do not accurately represent what the industrial equipment 110 can actually achieve, this can lead to windup of the MV as described above. At that point, large changes to the admissible range can occur and large changes to a steady-state optimization solution can ensue. When the MV repeatedly goes into and out of windup, second controller 104 SP zigzagging can occur, which is caused by existing controller 102 SP-PV tracking mechanisms trying to rectify the windup state of the second controller 104 by moving the associated MV in a fashion that causes the SP to move toward the PV. This can also cause jumps in optimization solutions for related manipulated variables.

Figure 2:
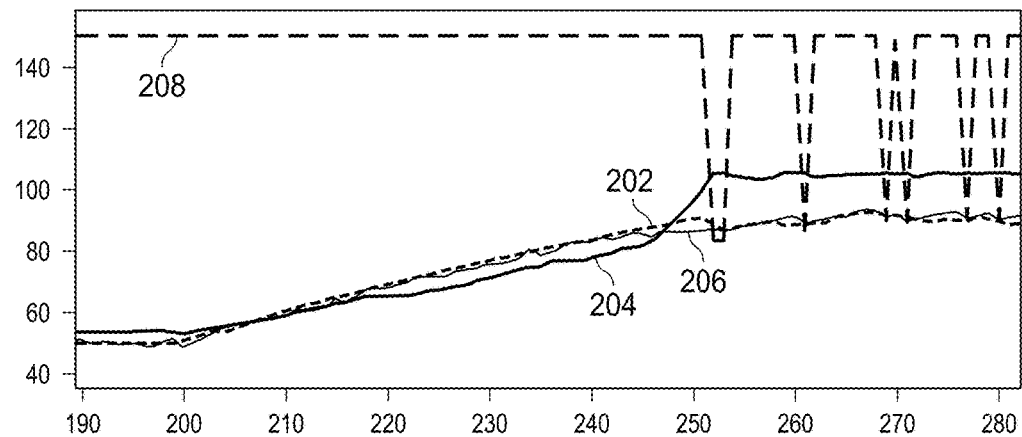
FIGS. 2 through 6D illustrate example details of windup control in a process control system according to this disclosure.

An example of this is shown in FIG. 2. FIG. 2 illustrates example oscillations caused by MV windup in a process control system 100 according to this disclosure. As shown in FIG. 2, line 202 represents a setpoint (SP) for the controller 104 generated from a controller 102 manipulated variable, and line 204 represents an output signal (OP) from the second controller 104. Also, line 206 represents a process variable (PV) for the controller 104, and line 208 represents an active high limit for the manipulated variable of the controller 102.

In FIG. 2, the OP signal begins to approach high limit saturation around sample 245 (roughly 80%), after which time the second controller 104 is pushed into and out of windup. As the second controller 104 goes into and out of windup and the associated MV in the controller 102 also goes into and out of windup, the active limit for the associated MV deviates from the user-specified limit and is clamped to the current SP value of the controller 104. Once the windup condition is removed, the MV returns to the user-specified limit. This is seen by the active high limit for the MV repeatedly oscillating between a higher value and a lower value. The higher value can represent the user-specified higher MV limit, and the lower value can represent a physical limit of the MV due to the controller 104 OP reaching an equipment limitation.

When user-specified MV limits become unachievable, controllers and optimizers often only realize this when an MV goes into windup. As a result, users are often forced to enter very conservative MV limits, which adversely affect MPC or other control capabilities and optimization potentials. Overly optimistic MV limits often drive the controller 104 into windup, creating prediction, optimization, and control issues.

A conventional work-around for this problem is to build a model between the MV of the controller 102 and the OP value of the controller 104. The OP value is included as a CV in the controller 102 and undergoes some type of transformation. A limit is then applied to the CV that represents the OP value to constrain the MV solution. However, this approach is very inconvenient, the MV-OP model can be unreliable, and OP noise can be transferred into the MV value.

Although not shown in FIG. 2, over a longer period of time, the MV represented by the SP value can zigzag up and down as the PV value moves up and down due to process disturbances D1 or the controller 102 SP-PV tracking mechanism is attempting to rectify the windup state. The down moves of the MV value can be caused by the controller 102 trying to get the SP value to track the PV value during a windup situation. The up moves of the MV value can be caused by the controller 102 pushing the MV value toward its user-specified high limit once the controller 104 comes out of windup. The steady-state MV value can drop to the SP value when the controller 104 goes into windup and jump back up to the user-specified high limit when the controller 104 comes out of windup. When the steady-state MV value jumps up and down, steady-state values associated with other manipulated variables can also jump up and down.

Another problem with conventional windup handling techniques is that the SP value of the associated MV is often used for predicting the CV value, which causes problems when the PV of the controller 104 cannot follow the SP value once the OP enters into an actuator's nonlinear operating region. Also, the SP-PV tracking mechanism of the controller 102 causes the SP of the associated MV to ramp to the PV when in windup, creating significant prediction problems during the ramping (since the PV value is not moving and that is what causes the CVs in the controller 102 to move).

In accordance with this disclosure, the controller 102 implements a technique for evaluating and selectively applying active MV limits. The outcome of this technique is called "achievable" MV limits. The achievable MV limits define the potential MV move space in light of the actual physical limits of the process (instead of the user-specified MV limits that typically do not accurately represent the physical limits). In addition to determining the achievable MV limits, the technique tracks PV movements of the controller 104 when the controller 104 is in windup. The PV values, after being properly filtered, are used in place of the current MV values to predict the future effect that the MV has on one or more controlled variables.

Figure 3:
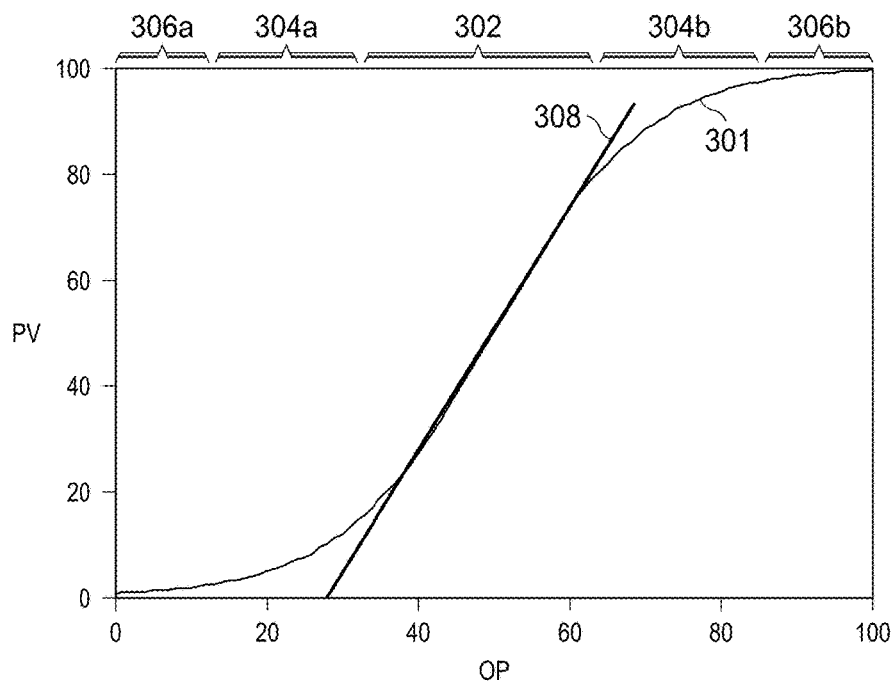

In ordinary systems, if an MPC controller 102 sends a SP value to a second controller 104, it is often assumed that the controller 104 functions so that the PV follows the SP. However, circumstances can arise where the controller 104 cannot alter the PV so that it follows the SP value. One such circumstance is a windup condition as described above. Consider, for example, FIG. 3. FIG. 3 illustrates an example OP-PV relationship in a process control system 100 according to this disclosure. In FIG. 3, line 301 represents an example relationship between the OP and PV values for a typical PID. Within a range 302, the PV and OP values have a substantially linear relationship (or at least a relationship that can be approximated linearly). This linear relationship is illustrated by a straight line 308. The slope of the line 308 defines the gain between the OP and PV values. In this particular case, the line 308 has a slope of approximately two, indicating that there is a gain of about two between the OP value and the PV value.

Within transitional ranges 304a-304b, the behavior of the OP-PV relationship becomes more non-linear. Rather than having a substantially linear gain of two, for example, the line 301 curves upward (region 304a) or downward (region 304b). This indicates that the gain becomes non-linear, so the PV value's response to changes in the OP value wanes.

As shown here, the PV value does not respond linearly to changes in the OP value at all times. The PV value may respond generally linearly within the region 302, but that effect fades in the transitional regions 304a-304b and substantially stops in the windup regions 306a-306b. Based on this, the achievable MV limits can be determined differently depending on where the current OP value falls.

In some embodiments, the achievable MV limits are estimated at each execution interval of the controller 102 based on user-specified information and past OP, PV, and SP values. The user-specified information used during achievable MV limit estimation can include an estimated OP to PV gain and/or a non-linear characteristics curve representing the OP-PV behavior. Depending on the implementation, the user could provide basic or more detailed information. In other embodiments, an online tool could be used to automatically model the OP-PV behavior using, for instance, historical data of the SP, OP, and PV values.

Figure 4A:
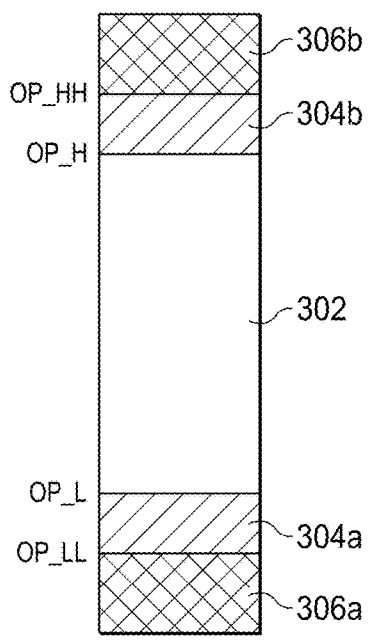

In some embodiments, a user can simply provide four values defining different ranges for the OP value. An example of this is shown in FIG. 4A, where four values (OP_LL, OP_L, OP_H, and OP_HH) define the boundaries between the regions 302-306b. Values OP_L and OP_H define the normal range 302 for the OP value. Value OP_LL defines the lower limit of the region 304a, which is defined as the range of OP values between OP_LL and OP_L. Similarly, value OP_HH defines the upper limit of the region 304b, which is defined as the range of OP values between OP_H and OP_HH. The region 306a is defined as OP values below OP_LL, and the region 306b is defined as OP values above OP_HH.

When defined in this manner, if the current OP value is within the range 302, the user-specified limits for an MV can represent the achievable MV limits since the PV value responds effectively to OP changes. If the current OP value is within either range 306a-306b, the PV value has little or no response to OP changes, and the manipulated variable's SP and achievable limits track the PV value with a gap. This means that the manipulated variable's SP and achievable limits generally track the PV value's movements with a small offset. If the current OP value is within either range 304a-304b, the user-specified MV limits may not be valid, and the achievable limits can be modified such as to slowly or quickly approach the achievable MV limits used in the windup regions 306a-306b. No additional specifications may be needed for this technique to work satisfactorily for a large class of equipment 110 (such as a large number of valves).

Figure 4B:
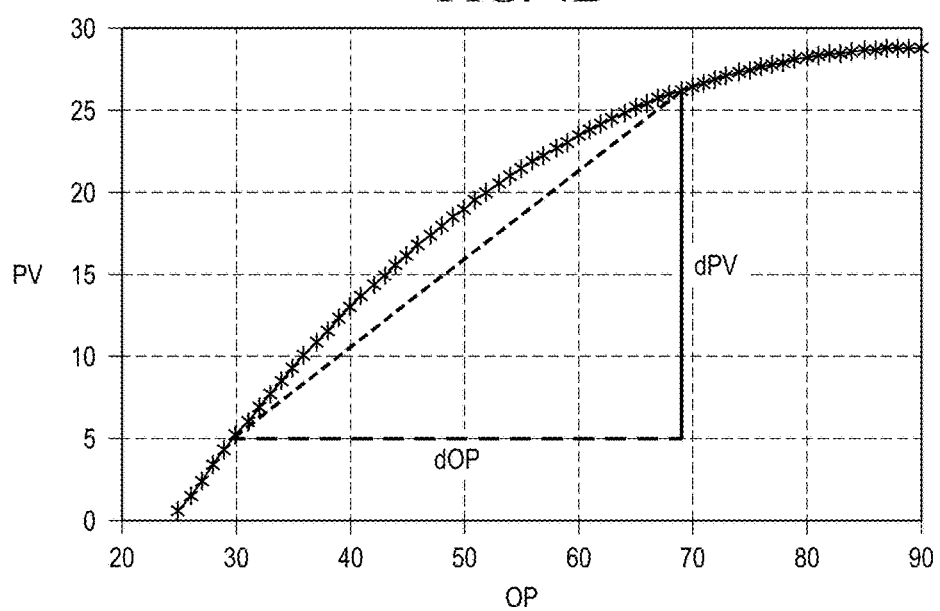

In other embodiments, a user can provide more detailed information. For example, a user could provide the four values (OP_LL, OP_L, OP_H, and OP_HH) and an estimated gain value between the OP and PV values. The OP-PV gain can be calculated by determining the slope (dPV/dOP) of a specific section of a curve as shown in FIG. 4B. This curve could be generated using historical data associated with the PV and OP values. Another way of estimating the OP-PV gain can be done by calculating the value of:

(PV High Process Limit−PV Low Process Limit)/
(OP Process High Limit−OP Process Low Limit)

where the OP Process High and OP Process Low limits are the maximum and minimum OP values, and the PV High and PV Low process limits are the expected/measured process values when OP operates at the OP Process High and OP Process Low limits, respectively. However the gain value is determined, the controller 102 can use the gain value to modify the achievable MV limits, whether the current OP value is within the normal region 302 or the transitional regions 304a-304b. Once the current OP value enters the windup regions 306a-306b, the manipulated variable's SP and achievable limits track the PV value with a gap.

In still other embodiments, a user could define the OP-PV relationship by providing coefficients for a polynomial curve or by defining a piecewise linear segmented curve. In particular embodiments, the polynomial could have the form:

$$PV = a_0 + a_1 \times OP + a_2 \times OP^2 + a_3 \times OP^3 + a_4 \times OP^4 + D1.$$

Here, D1 represents the disturbance variable(s) shown in FIG. 1 and may or may not be estimated by the user. In this case, the user can define the polynomial by providing the coefficients $a_0$-$a_4$. The user can also specify the OP_LL and OP_HH values, or an algorithm could estimate the OP_LL and OP_HH values using the polynomial curve coefficients or piecewise linear segments (such as by identifying the areas of the polynomial or piecewise linear segmented curve where significant flattening occurs). As long as the current OP value remains between OP_LL and OP_HH, the controller 102 can predict the achievable MV limits based on the polynomial curve coefficients or piecewise linear segments and the OP, PV, and SP values. Once the current OP value enters the windup regions 306a-306b, the manipulated variable's SP and achievable limits track the PV value with a gap. This approach may be useful, for instance, if the user has a specialized piece of equipment 110 with some uncommon characteristics. When the user provides polynomial coefficients, the polynomial curve can be used to model the equipment's behavior. When the user defines a piecewise linear segmented curve, the mechanism is essentially the same as with the polynomial curve, except the piecewise linear segmented curve usurps the polynomial curve.

However the information defining the OP-PV relationship is provided, the controller 102 uses this information to predict the achievable MV limits. The achievable MV limits are then used to determine the best MV values for predicting future changes to a controlled variable.

In this way, the controller 102 is able to estimate what can be achieved using MV changes sooner using more accurate predictions, which facilitates better control of the processes 111a-111b. Effectively, the controller 102 gains knowledge of the "true" MV limits, rather than simply relying on the user-specified limits. This may allow the user to enter loose MV limits, and the controller 102 decides the full potential of those limits.

The gap between (i) the manipulated variable's SP and achievable limits and (ii) the PV value when OP is in the windup regions 306a-306b may be bigger than the typical noise present in the PV values. The PV value noise could be calculated online, and the gap could then be calculated as a function of the noise. Through these operations, the controller 104 can be kept in the windup condition to keep the PV at an extreme value (which can be done to achieve maximum economic benefit). Since the controller 104 does not go into and out of windup, a steady-state solution does not experience large jumps.

When a change in the MV is needed in an anti-windup direction (away from the windup condition), the following change to the MV can be made instead by controller 102:

$$dMV_F = dMV_I \pm (PV - SP)$$

where $dMV_I$ represents the normal MV change if the MV is not in windup, and $dMV_F$ represents the adjusted MV change made by the controller 102 taking into consideration the gap denoted as PV-SP. Moves to close the gap between the PV value and the SP are not used for prediction.

The achievable MV limits can be used by the controller 102 for optimization and control move calculations. In this way, big jumps in the optimization solution can be avoided when the controller 104 enters windup, and the control behavior can be significantly improved. The PV value tracking helps to ensure that the MV value used to predict the effect on the controlled variable(s) is more closely related to what is happening in the actual process 111b. This can lead to more accurate forward predictions used by the controller 102 to determine an optimization solution and future control moves.

With the implementation of this technique for calculating achievable MV limits and making more accurate future predictions, a user can specify the user-specified MV limits more optimistically, knowing that the controller 102 has a "grace-saving" algorithm built in. Moreover, with this technique, the user can choose to allow the controller 102 to operate with an OP value fully saturated or at equipment limits. In that case, the user no longer has to create a solution to prevent false/inaccurate predictions for the controller 102 when windup occurs or implement a tracking algorithm to keep the SP close to the PV value when the controller 104 needs to move out of windup. Moreover, the user no longer has to create makeshift CV constraints for the OP of the controller 104 to prevent saturation or implement and maintain transformations for any CV constraints that are added to the controller 102 to prevent saturation.

This technique can be implemented so that high frequency noise and disturbances do not significantly affect the estimated achievable MV limits or adversely affect the choice of the MV values used in the future CV prediction calculation. This can help make the control system even more robust.

Figure 5A:
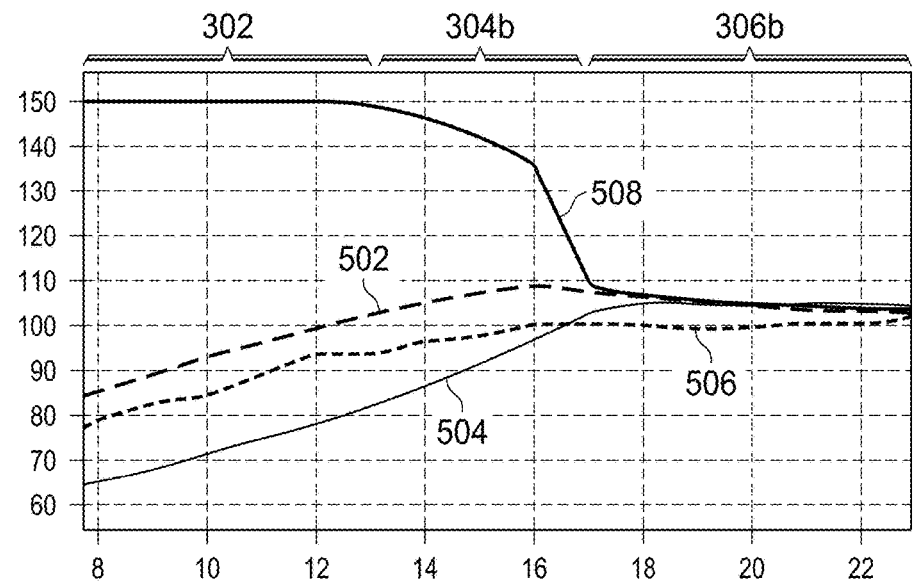
Figure 5B:
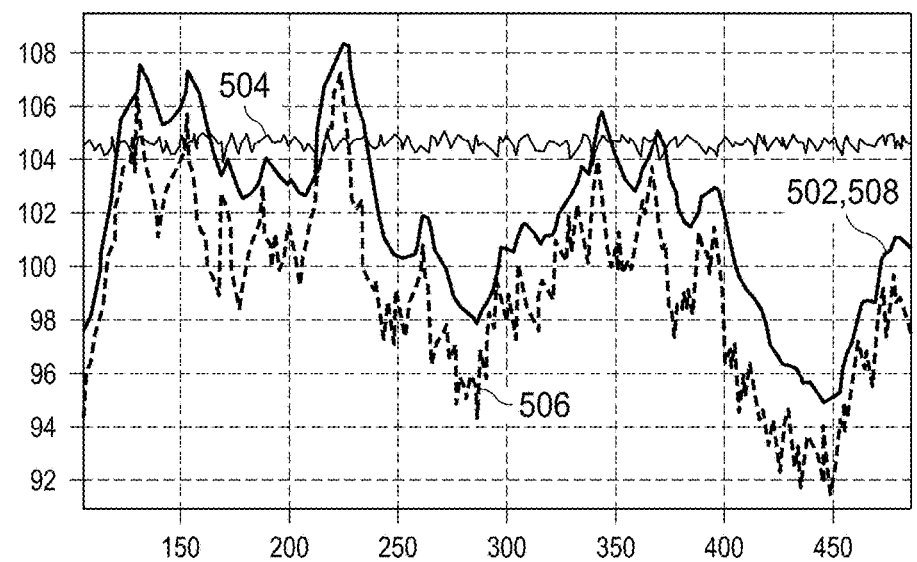

FIGS. 5A and 5B illustrate example achievable MV limits that can be calculated using windup control in a process control system 100 according to this disclosure. In particular, FIGS. 5A and 5B illustrate simulated behavior when a user simply provides the four values OP_LL, OP_L, OP_H, and OP_HH.

FIG. 5A illustrates an achievable high MV limit within different regions 302, 304b, 306b during operation of the controller 102. In FIG. 5A, line 502 represents the SP for a manipulated variable, and line 504 represents the associated OP value of a PID controller. Line 506 represents the associated PV value of a PID controller, and line 508 represents the achievable high limit for the manipulated variable.

When the OP value is within the normal range 302 of operation, the achievable limit represented by the line 508 remains at a high level, which can represent the user-specified high MV limit. However, as the OP value increases, the OP value enters the transitional range 304b. In this range 304b, the achievable limit represented by the line 508 moves away from the user-specified high MV limit and approaches the manipulated variable's SP. When the OP value enters the windup region 306b, the manipulated variable's SP and achievable limit track the PV value with a gap.

FIG. 5B illustrates an example achievable MV limit within the windup region 306b during operation of the controller 102. As shown in FIG. 5B, the OP value represented by the line 504 remains at a high level, indicating that the MV is in windup. Even if the PV value represented by the line 506 swings up and down, the controller 102 ensures that the manipulated variable's SP (represented by the line 502) and the achievable limit (represented by the line 508) both track the PV value with a gap. As described above, this can provide various benefits depending on the implementation.

Figure 6A:
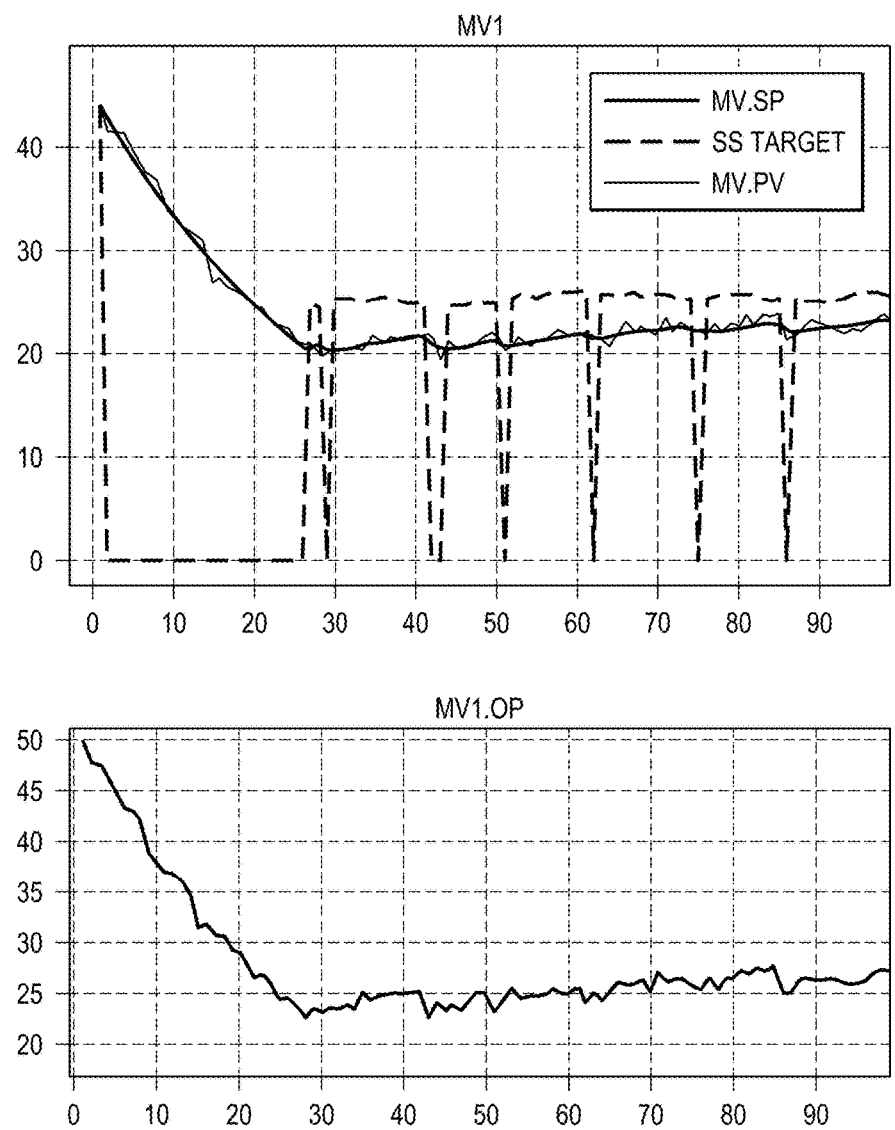
Figure 6B:
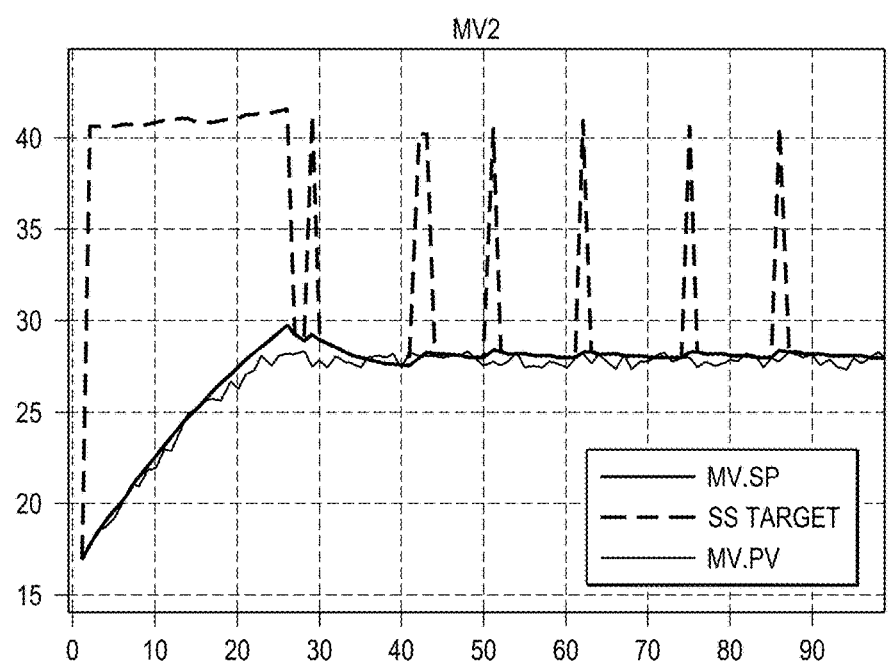
Figure 6B:
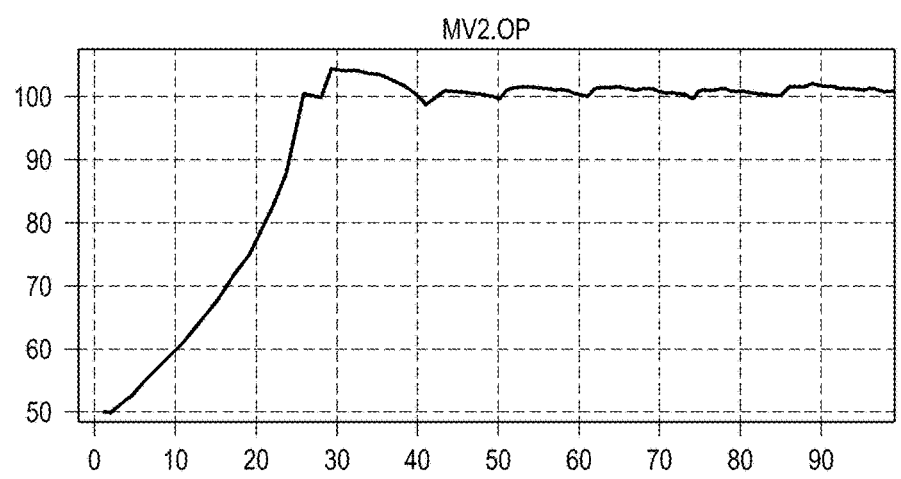

FIGS. 6A through 6D illustrate other examples of achievable MV limits that can be calculated using windup control in a process control system 100 according to this disclosure. In particular, FIGS. 6A and 6B illustrate simulated persistent steady-state solution swings caused by a PID controller for a manipulated variable MV2 entering and exiting windup due to an unachievable user-specified MV limit. In this case, the MV2 user-specified high limit is 50, and (since the controller 102 is configured to maximize MV2) it calculates a steady-state target of a value around 40 for MV2 and tries to push MV2 to the target. However, the downstream PID controller for MV2 enters a windup state when MV2 reaches a value of around 28. The controller 102 only then realizes that the calculated target based on MV2 is not really achievable, and it starts to make adjustments. The adjustments the controller 102 makes cause MV1 and MV2 optimization solution oscillations.

Figure 6C:
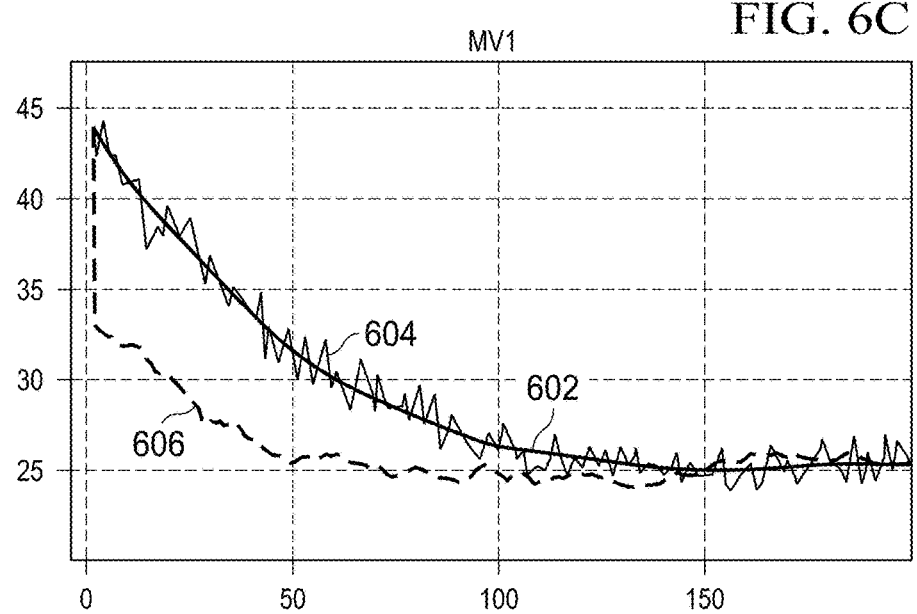
Figure 6D:
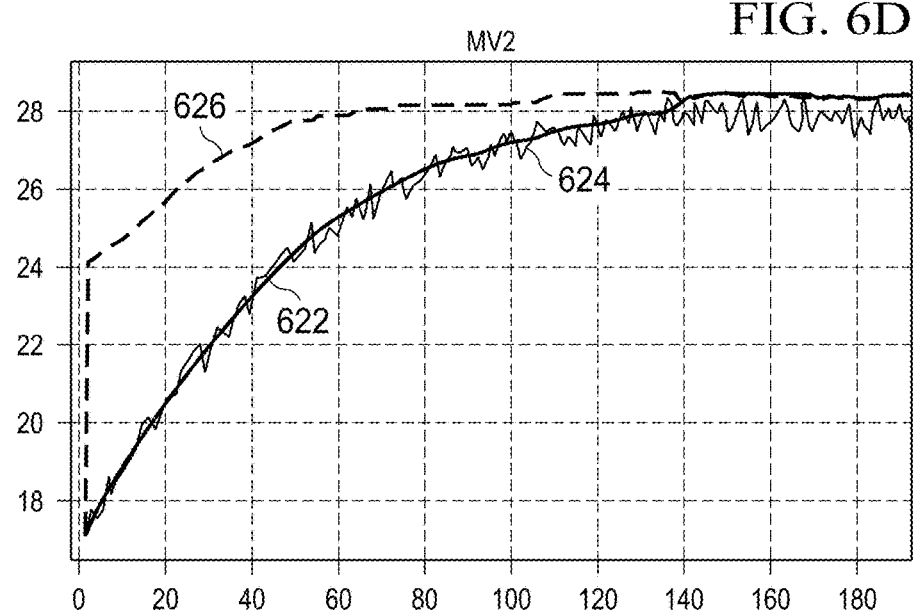

FIGS. 6C and 6D illustrate simulated behavior under the same conditions as FIGS. 6A and 6B, except that a user provides the four values OP_LL, OP_L, OP_H, and OP_HH and an estimated OP-PV gain value to estimate the achievable MV limits. Here, FIGS. 6A through 6D illustrate simulated use of two manipulated variables (MV1 and MV2), which are used to control two controlled variables (CV1 and CV2). MV1 can be controlled with a PID controller gain ($K_C$) of one and an integral time of ten, and MV2 can be controlled with a PID controller gain of 0.5 and an integral time of ten. Ideally, MV1 and MV2 are used to keep CV1 and CV2 within limits, and MV2 and CV2 are maximized for optimization purposes.

In FIG. 6C, a graph represents signals associated with control using MV1. Here, line 602 denotes MV1's SP, and line 604 denotes MV1's associated PV value. Also, line 606 denotes the steady-state target for MV1. The steady-state target is calculated using the achievable limit for MV1, which can be computed as described above. In this case, the estimated gain in the central region (region 302) of the OP-PV relationship is provided as 0.7, and the limit values are defined as OP_HH=95, OP_H=80, OP_LL=0, and OP_L=15.

In FIG. 6D, a graph represents signals associated with control using MV2. Here, line 622 denotes MV2's SP, and line 624 denotes MV2's associated PV value. Also, line 626 denotes the steady-state target for MV2. The steady-state target is calculated using the achievable limit for MV2, which can be computed as described above. In this case, the estimated gain in the central region (region 302) of the OP-PV relationship is provided as 0.3, and the limit values are defined as OP_HH=90, OP_H=75, OP_LL=25, and OP_L=25 (meaning there is no transitional region 304a for MV2).

For both cases shown in FIGS. 6C and 6D, the achievable MV limit is used in the calculation of the steady-state target for the MV value. Based on the user-specified information, the controller 102 estimates that the MV2 achievable limit is only about 24 (instead of the user-specified value 50) at the beginning. As the calculations continue, the MV2 achievable limit is adjusted to about 28. As a result, the steady-state targets for MV1 and MV2 do not jump up and down as they do in FIGS. 6A and 6B. The use of the achievable MV limit can help make the calculations of the steady-state targets more accurate. This is because these calculations can be made with knowledge of what the "true" MV limits are (and not simply based on the user-specified limits at all times).

Note that in FIGS. 6C and 6D, the user has manually defined the gains for the regions 302 of the OP-PV relationships. As described above, the user could alternatively provide coefficients for polynomial curves or define piecewise linear segmented curves describing the MV.OP and MV.PV relationship. For example, the polynomial coefficients for MV1 could be [7.306743, 0.266297, 0.0150809, −0.0001153, 0], and the polynomial coefficients for MV2 could be [−31.738496, 1.535986, −0.01222, 0.0000279, 0]. With these values, the lines 606 and 626 could form sharper right angles in FIGS. 6C and 6D. This is due to the fact that the system can more accurately identify the achievable MV limits using the polynomial or piecewise linear segmented curves, rather than just using the OP_HH, OP_H, OP_L, and OP_LL limits and user-specified OP-PV gain.

Returning to FIG. 3, the following describes a specific way in which the achievable MV limit for an MV can be calculated in the different regions 302-306b. In the following discussion, only the achievable high MV limit is dealt with, although similar calculations could be made for the achievable low MV limit. Within the transitional range 304b, a windup ratio (W) can be expressed as:

$$\text{Windup\_Ratio} = W = \frac{OP - OP\_H}{OP\_HH - OP\_H}$$

where OP denotes the current OP value. The windup ratio W causes the achievable limit to move from the user-specified value at OP=OP_H to the SP at OP=OP_HH (as shown in FIG. 5A).

In FIG. 5A, the achievable high MV limit can be adjusted in the transitional stage 304b as follows:

$$MV\_H\_\text{Adjust}=(1-W) \times MV\_H\_Ent + W \times SP$$
$$MV\_H\_Ach(k)=0.8 \times MV\_H\_Ach(k-1)+0.2 \times MV\_H\_\text{Adjust}$$

Here, MV_H_Ach(k) denotes the achievable limit at time interval k, and MV_H_Ach(k−1) denotes the achievable limit at time interval (k−1). Also, MV_H_Adjust represents an adjustment made to the user-specified limit based on the windup ratio, and SP denotes the SP value. In addition, MV_H_Ent represents the user-specified MV limit. This shows that as the value of W approaches one (as OP approaches OP_HH in the transitional range), the MV_H_Ach value approaches the SP value. Within the windup range 306b, the achievable high MV limit can be expressed as:

$$MV\_H\_Ach(k)=SP(k-1)$$

Here, the current value of the achievable high MV limit is equal to the prior SP value.

Figure 7:
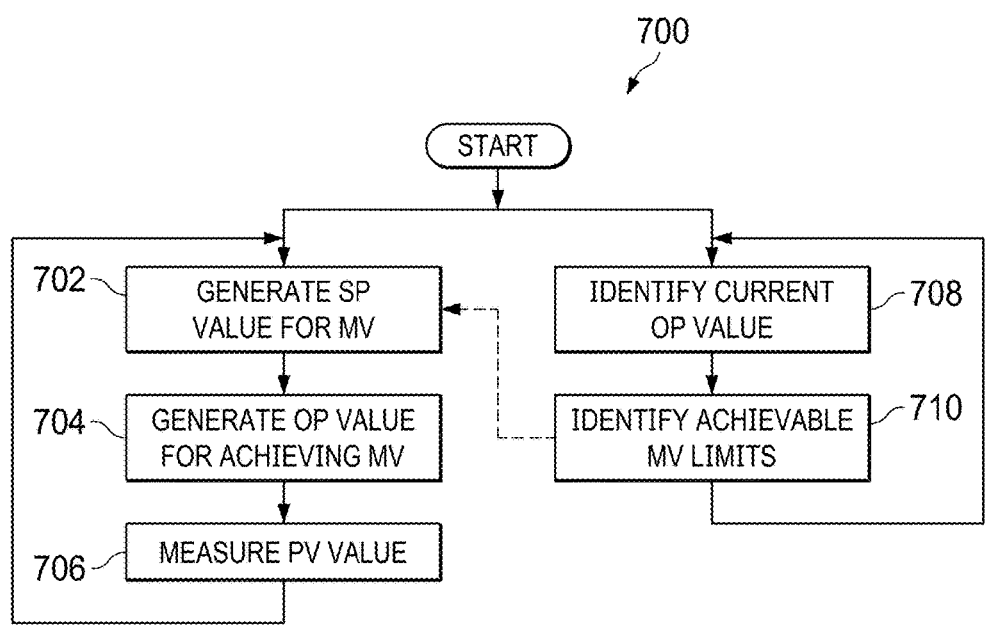
FIGS. 7 and 8 illustrate an example method for windup control in a process control system according to this disclosure.
Figure 8:
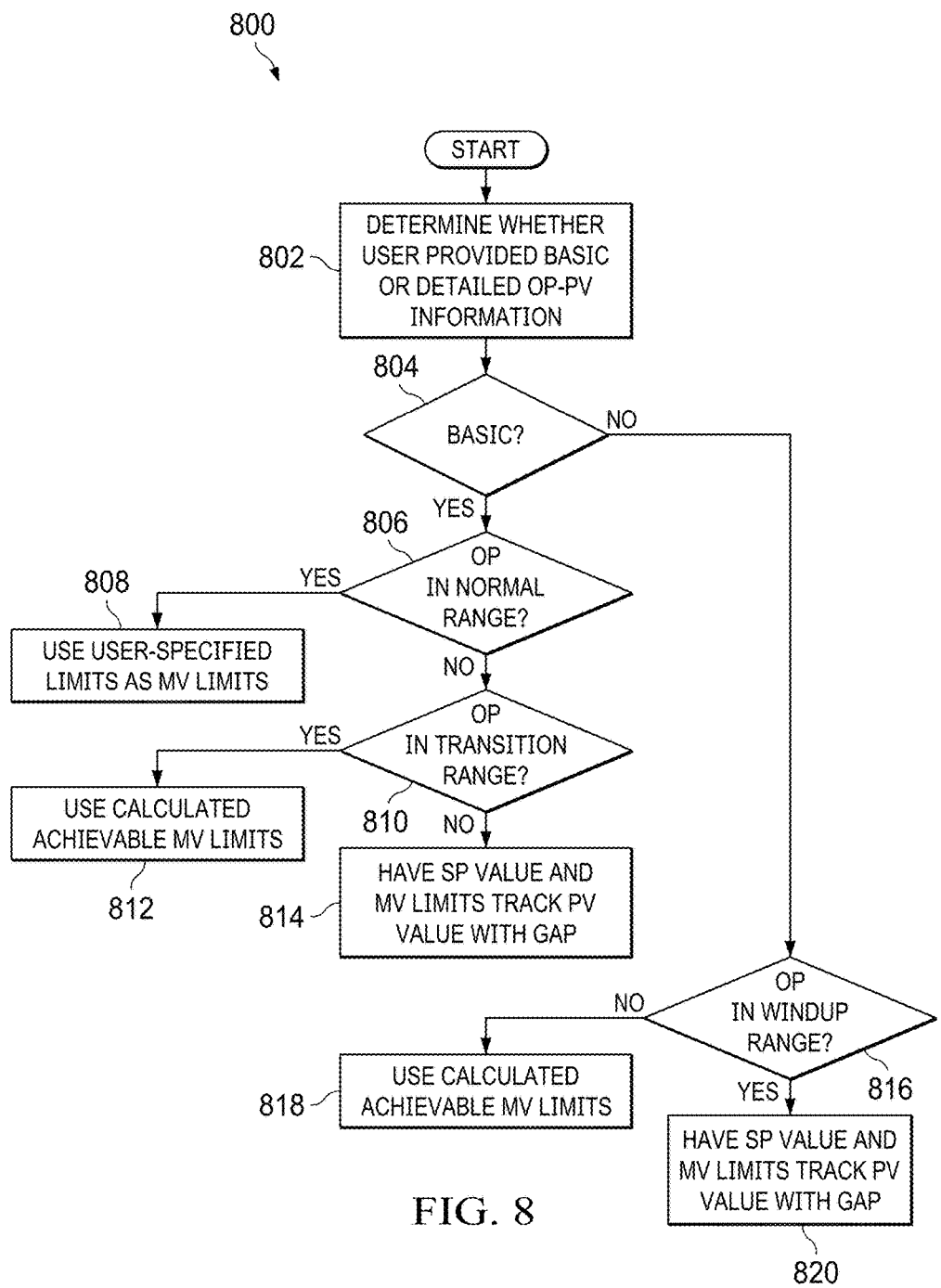

FIGS. 7 and 8 illustrate an example method for windup control in a process control system 100 according to this disclosure. As shown in FIG. 7, a method 700 includes generating a setpoint value SP for a manipulated variable MV at step 702, such as a SP that (ideally) helps maintain desired control of a controlled variables CV. An output value OP for achieving the MV is generated at step 704, such as an OP value for causing a desired change to the process variable PV so that it follows the SP. A PV value is measured at step 706, such as by using the sensor 112a. The actual measurement allows the control system to determine whether the desired control of the PV is being achieved. The step 702 can be performed by the first controller 102, such as an MPC controller. The step 704 can be performed by the second controller 104, such as a PID controller. The step 706 can be performed by the sensor 112b. The steps 702-706 can be repeated over any number of control intervals to provide continuous control over the processes 111a-111b.

In parallel with the control of the processes 111a-111b, the current OP value is identified at step 708, and achievable MV limits are identified using the current OP value at step 710. These steps 708-710 could include, for example, the controller 102 determining whether the current OP value is in a normal region, a transitional region, or a windup region. This could also include the controller 102 determining what information was supplied by a user (OP_LL/OP_L/OP_H/OP_HH values, gain value, polynomial coefficients, piecewise linear segments). The controller 102 can then alter the achievable MV limits away from user-specified MV limits (if necessary). The calculated achievable MV limits can be used by the controller 102 during step 702 to determine the next SP value.

FIG. 8 illustrates an example method 800 for identifying achievable MV limits based on the current OP value. As shown in FIG. 8, a determination is made whether the user previously provided basic or detailed information about the OP-PV relationship at step 802. Basic information could represent the four values (OP_LL, OP_L, OP_H, and OP_HH) only. Detailed information could represent these four values plus the gain value, polynomial coefficients, or piecewise linear segments. If basic information is provided, the decision block at step 804 causes the achievable MV limits to be calculated according to steps 806-814. If detailed information is provided, the decision block at step 804 causes the achievable MV limits to be calculated according to steps 816-820.

When basic information is provided, a determination is made whether the current OP value is within a normal operating region at step 806. This could include, for example, the controller 102 determining whether the current OP value is between the OP_L and OP_H limits. If so, the controller uses one or more user-specified MV limits as the achievable MV limits at step 808. If not, a determination is made whether the current OP value is within a transitional operating region at step 810. This could include, for example, the controller 102 determining whether the current OP value is between the OP_LL and OP_L limits or between the OP_H and OP_HH limits. If so, the controller uses one or more calculated achievable MV limits at step 812. The calculated achievable MV limits can move away from the user-specified limits and towards the achievable MV limits that are used when in the windup regions. Otherwise, the current OP value is within a windup operating region. This could occur, for example, when the current OP value is below the OP_LL limit or above the OP_HH limits. In that case, the controller causes the SP value and the achievable MV limits to track the PV value with a gap at step 814.

When detailed information is provided, a determination is made whether the current OP value is within a windup region at step 816. This could include, for example, the controller 102 determining whether the current OP value is below the OP_LL limit or above the OP_HH limit. If not, the controller uses one or more calculated achievable MV limits at step 818. The achievable MV limits could be calculated based on the OP-PV gain, where that gain is used in different ways depending on whether the current OP value is in a normal or transitional region. Otherwise, the current OP value is within a windup region, and the controller causes the SP value and the achievable MV limits to track the PV value with a gap at step 820.

The following calculations can be performed during the identification of the achievable high MV limit in FIG. 8 when the user has provided the OP_LL, OP_L, OP_H, OP_HH, and gain values. A similar process could be used to identify the achievable low MV limit. An estimated aggressive high achievable limit is denoted MV_HI_AH, and an estimated conservative high achievable limit is denoted MV_HI_AL. The high achievable limit MV_HI_A is a value between MV_HI_AH and MV_HI_AL. MV_HI_A(k) denotes the high achievable limit calculated at a current interval k, and MV_HI_A(k−1) denotes the high achievable limit calculated at the past interval k−1.

When the current OP value is in the normal or effective region (OP<OP_H) and the OP-PV gain is greater than zero, the following summarizes the general procedure that could be used:

---

MV_HI_AH = $PV_F$ + PV_Noise + 0.5×User_Gain×(OP_HH−OP_H) + User_Gain×(OP_H−OP)
MV_HI_AL = $PV_F$ + PV_Noise + 0.25×User_Gain×(OP_HH−OP_H) + User_Gain×(OP_H−OP)
If (MV_HI_A(k−1) > MV_HI_AH)
    MV_HI_A(k) = 0.9×MV_HI_A(k−1) + 0.1×MV_HI_AH
elseif (MV_HI_A(k−1) < MV_HI_AL)
    MV_HI_A(k) = MV_HI_AL
else
    MV_HI_A(k) = MV_HI_A(k−1)
end

---

In these calculations, $PV_F$ denotes a properly-filtered PV value, and PV_Noise denotes an estimated noise magnitude in the PV signal. Also, User_Gain denotes the user-specified gain between OP and PV. In this example, a possible range (defined by MV_HI_AL and MV_HI_AH) is calculated for the MV high achievable limit at each control interval. The User_Gain is discounted for the operating range between OP_H and OP_HH by a factor of 0.5 in the MV_HI_AH calculation. The User_Gain is more heavily discounted by a factor of 0.25 in the MV_HI_AL calculation. Note that the values 0.5 and 0.25 can be changed, such as if a user has deeper knowledge about the OP-PV characteristic curve. If the MV high achievable limit at the previous interval MV_HI_A(k−1) is within the range, the MV high achievable limit at the current interval MV_HI_A(k) is set to the previous value MV_HI_A(k−1). If the MV high achievable limit at the previous interval MV_HI_A(k−1) is larger than the high limit of the range MV_HI_AH, the MV high achievable limit at the current interval MV_HI_A(k) is filtered towards MV_HI_AH. If the MV high achievable limit at the previous interval MV_HI_A(k−1) is smaller than the low limit of the range MV_HI_AL, the MV high achievable limit at the current interval MV_HI_A(k) is set as MV_HI_AL. By calculating a range to estimate the MV high achievable limit, significant noise and disturbances can be blocked from OP and PV to the MV high achievable limit. Otherwise, the calculated MV high achievable limit may fluctuate significantly due to noise contained in OP and PV, which can be very undesirable from the perspective of the MPC.

When the current OP value is in a transitional region (OP_H<OP<OP_HH) and the OP-PV gain is greater than zero, the following summarizes the general procedure that could be used:

---

MV_HI_AH = $PV_F$ + PV_Noise + max(0.25, min(0.5, 1−W))× User_Gain×(OP_HH−OP)
MV_HI_AL = $PV_F$ + PV_Noise + 0.25×User_Gain×(OP_HH−OP)
If (MV_HI_A(k−1) > MV_HI_AH)
    MV_HI_A(k) = 0.9×MV_HI_A(k−1) + 0.1×MV_HI_AH
elseif (MV_HI_A(k−1) < MV_HI_AL)
    MV_HI_A(k) = MV_HI_AL
else
    MV_HI_A(k) = MV_HI_A(k−1)
end

---

Here, min and max denote minimum and maximum functions, respectively. The difference of the calculation here compared to when OP is within the effective range is in the calculation of MV_HI_AH and MV_HI_AL. The user gain is adjusted by the windup ratio W, previously defined as:

$$W = \frac{OP - OP\_H}{OP\_HH - OP\_H}.$$

When the current OP value is in a windup region (OP_HH<OP), the following summarizes the general procedure that could be used to force the achievable MV limit to track the PV value with a gap as follows:

$$MV\_HI\_A = MV\_HI\_AH = MV\_HI\_AL = PV_F + PV\_\text{Gap}$$

In this embodiment, the value of PV_Gap can be used as PV_noise or a function of it.

In some embodiments, an OP-PV model can be created and is denoted as f such that PV=f(OP). At each control iteration, an MV high achievable limit can be estimated as:

$$MV\_HI\_A = f(OP\_HH) - f(OP) + PV_F + PV\_\text{Noise}$$

where OP is the current OP value measurement. Filtering can be applied to the predictions, and bad or missing data can be handled using various techniques. If significant noise or disturbances exist in the PV or OP value or if there is a significant amount of uncertainty in the function f describing the OP-PV relationship, the MV_HI_AH, MV_HI_AL, and MV high achievable limit could be calculated as follows:

---

MV_HI_AH = c1×(f(OP_HH) − f(OP)) + $PV_F$ + PV_Noise
MV_HI_AL = c2×(f(OP_HH) − f(OP)) + $PV_F$ + PV_Noise
If (MV_HI_A(k−1) > MV_HI_AH)
    MV_HI_A(k) = 0.9×MV_HI_A(k−1) + 0.1×MV_HI_AH
elseif (MV_HI_A(k−1) < MV_HI_AL)
    MV_HI_A(k) = MV_HI_AL
else
    MV_HI_A(k) = MV_HI_A(k−1)
end Here, c1 and c2 are some constants, where c1>c2. For example, c1 can be given a value of 1.1, and c2 can be given a value of 0.9.

Although the various figures described above illustrate various features of a process control system 100 and related techniques for windup control, various changes may be made to these figures. For example, a control system could include any number of processes, sensors, actuators, equipment, controllers, and other components in any suitable arrangement. Also, the use of three types of regions for windup control (normal, transitional, and windup) is for illustration only, and other than three regions could be supported. Further, any suitable technique can be used to define an OP-PV relationship and define the regions associated with windup control. Moreover, simulated behavior represents specific simulations of specific systems, and other systems can exhibit other behaviors. Beyond that, the specific algorithms shown above are for illustration only, and other algorithms could be used. In addition, equations provided above may use expressions having specific values (such as constants like 0.9, 0.1, 0.5, and 0.25) or other expressions. These equations are for illustration only, and other expressions could be used.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving at an upstream controller an output (OP) value used to implement a manipulated variable, the manipulated variable associated with an industrial process, the OP value comprising an output of a downstream controller;
identifying, by the upstream controller, one of multiple regions in a range where the OP value is located;
calculating, by the upstream controller, an achievable manipulated variable (MV) limit for the manipulated variable based on the region in which the OP value is located;
calculating, by the upstream controller, a setpoint for the manipulated variable based on the region in which the OP value is located;
sending the setpoint to the downstream controller;
receiving the setpoint at the downstream controller; and
using the downstream controller, generating a control signal that adjusts operation of an actuator in order to change a value of a process variable associated with the industrial process so that the process variable follows the setpoint;
wherein calculating the achievable MV limit comprises:
when the OP value is located in a first of the regions, causing the achievable MV limit to match a user-specified MV limit;
when the OP value is located in a second of the regions, causing the achievable MV limit to track the value of the process variable with a gap between the achievable MV limit and the value of the process variable, the process variable affected by the manipulated variable; and
when the OP value is located in a third of the regions between the first and second regions, causing the achievable MV limit to move from the user-specified MV limit toward the value of the process variable.

2. The method of claim 1, further comprising receiving at least one of:
values defining boundaries between the regions;
a gain defining how the process variable responds to changes in the OP value within at least one of the regions; and
information identifying coefficients for a polynomial curve or piecewise linear segments defining a relationship between the OP value and the value of the process variable.

3. The method of claim 1, further comprising:
using the achievable MV limit to predict the value of the process variable.

4. The method of claim 1, further comprising:
using the achievable MV limit to identify an optimization solution for controlling the manipulated variable and one or more related manipulated variables;
wherein use of the achievable MV limit to identify the optimization solution prevents the optimization solution from repeatedly jumping back and forth.

5. The method of claim 1, further comprising:
using the actuator and in response to the control signal, causing a change to the value of the process variable so that the process variable follows the setpoint.

6. The method of claim 5, wherein:
the industrial process is implemented using one or more pieces of industrial equipment; and
the actuator adjusts at least one of the one or more pieces of industrial equipment to cause the change to the value of the process variable.

7. The method of claim 1, wherein:
the upstream controller comprises a model predictive control (MPC) controller; and the downstream controller comprises a proportional-integral-derivative (PID) controller.

8. A system comprising:
a first industrial process controller and a second industrial process controller;
wherein the first controller comprises at least one processing unit configured to:
receive an output (OP) value used to implement a manipulated variable, the manipulated variable associated with an industrial process, the OP value comprising an output of the second controller;
identify one of multiple regions in a range where the OP value is located;
calculate an achievable manipulated variable (MV) limit for the manipulated variable based on the region in which the OP value is located;
calculate a setpoint for the manipulated variable based on the region in which the OP value is located; and
send the setpoint to the second controller; and
wherein the second controller is configured to:
receive the setpoint from the first controller; and
generate and output a control signal that adjusts operation of an actuator in order to change a value of a process variable associated with the industrial process so that the process variable follows the setpoint; and
wherein, to calculate the achievable MV limit, the at least one processing unit is configured to:
when the OP value is located in a first of the regions, cause the achievable MV limit to match a user-specified MV limit;
when the OP value is located in a second of the regions, cause the achievable MV limit to track the value of the process variable with a gap between the achievable MV limit and the value of the process variable, the process variable affected by the manipulated variable; and
when the OP value is located in a third of the regions between the first and second regions, cause the achievable MV limit to move from the user-specified MV limit toward the value of the process variable.

9. The system of claim 8, wherein the at least one processing unit is configured to receive at least one of:
values defining boundaries between the regions;
a gain defining how the process variable responds to changes in the OP value within at least one of the regions; and
information identifying coefficients for a polynomial curve or piecewise linear segments defining a relationship between the OP value and the value of the process variable.

10. The system of claim 8, further comprising:
at least one interface configured to provide the setpoint to the second controller; wherein the at least one processing unit is configured to identify and adjust the achievable MV limit and the setpoint for the manipulated variable while the second controller is in windup.

11. The system of claim 8, wherein the actuator is configured, in response to the control signal, to cause a change to the value of the process variable so that the process variable follows the setpoint.

12. The system of claim 11, wherein:
the industrial process is implemented using one or more pieces of industrial equipment; and
the actuator is configured to adjust at least one of the one or more pieces of industrial equipment to cause the change to the value of the process variable.

13. The system of claim 8, wherein:
the first controller is further configured to use the achievable MV limit to identify an optimization solution for controlling the manipulated variable and one or more related manipulated variables; and
use of the achievable MV limit to identify the optimization solution prevents the optimization solution from repeatedly jumping back and forth.

14. The system of claim 8, wherein:
the first controller comprises a model predictive control (MPC) controller; and
the second controller comprises a proportional-integral-derivative (PID) controller.

15. A system comprising:
an upstream first controller configured to control an industrial process;
a downstream second controller configured to generate an output (OP) value used to implement a manipulated variable associated with the industrial process; and
an actuator configured to alter the industrial process;
wherein the first controller is configured to:
receive the OP value;
identify one of multiple regions in a range where the OP value is located;
calculate an achievable manipulated variable (MV) limit for the manipulated variable based on the region in which the OP value is located;
calculate a setpoint for the manipulated variable based on the region in which the OP value is located; and
send the setpoint to the downstream second controller;
wherein the second controller is configured to:
receive the setpoint from the first controller; and
generate and output a control signal; and
wherein the control signal adjusts operation of the actuator in order to change a value of a process variable associated with the industrial process so that the process variable follows the setpoint; and
wherein, to calculate the achievable MV limit, the first controller is configured to:
when the OP value is located in a first of the regions, cause the achievable MV limit to match a user-specified MV limit;
when the OP value is located in a second of the regions, cause the achievable MV limit to track the value of the process variable with a gap between the achievable MV limit and the value of the process variable, the process variable affected by the manipulated variable; and
when the OP value is located in a third of the regions between the first and second regions, cause the achievable MV limit to move from the user-specified MV limit toward the value of the process variable.

16. The system of claim 15, wherein:
the first controller comprises a model predictive control (MPC) controller; and.
the second controller comprises a proportional-integral-derivative (PID) controller.

17. The system of claim 15, wherein the first controller is further configured to receive at least one of:
values defining boundaries between the regions;
a gain defining how the process variable responds to changes in the OP value within at least one of the regions; and
information identifying coefficients for a polynomial curve or piecewise linear segments defining a relationship between the OP value and the value of the process variable.

18. The system of claim 15, wherein the first controller is further configured to use the achievable MV limit to predict the value of the process variable.

19. The system of claim 15, wherein:
   the first controller is further configured to use the achievable MV limit to identify an optimization solution for controlling the manipulated variable and one or more related manipulated variables; and
   use of the achievable MV limit to identify the optimization solution prevents the optimization solution from repeatedly jumping back and forth.

20. The system of claim 15, wherein the actuator is configured, in response to the control signal, to cause a change to the value of the process variable so that the process variable follows the setpoint.

* * * * *